J. FRIEDLAND.
SAFETY RECEIVING BOX.
APPLICATION FILED FEB. 10, 1917.

1,266,007.

Patented May 14, 1918.

Inventor
Joseph Friedland
By his Attorney
W. T. Criswell.

UNITED STATES PATENT OFFICE.

JOSEPH FRIEDLAND, OF BROOKLYN, NEW YORK.

SAFETY RECEIVING-BOX.

1,266,007. Specification of Letters Patent. Patented May 14, 1918.

Application filed February 10, 1917. Serial No. 147,852.

*To all whom it may concern:*

Be it known that I, JOSEPH FRIEDLAND, a citizen of the United States, and a resident of New York, borough of Brooklyn, county of Kings, and State of New York, have invented a certain new and useful Improvement in Safety Receiving-Boxes, of which the following is a full, clear, and exact specification.

This invention relates more particularly to a class of devices adapted to be used for safe keeping of food products.

My invention has for its object primarily to provide a box, or container whereby food products, such as groceries, milk, ice and other articles may be delivered to a home without notifying or disturbing the occupants to receive them as well as keeping the products in a clean sanitary condition besides prevented from being surreptitiously taken, and which is of a form adapted to be placed outside of the home to allow the articles to be placed therein after which the box is locked in a manner that the owner only may open it for removal of the contents. The invention consists essentially of a casing having one or more compartments each with an entrance having a door adapted to be swung to open and closed positions, and each door has a locking device for releasably fastening the door when closed. In each compartment is a retaining element which is engaged by the locking device when its door is closed, and each retaining element is manually operable for releasing the locking device to permit the door to be opened.

Another object of the invention is to provide means for removably locking the retaining element to the casing as well as detachably fastening the device to a support to prevent it from being stolen; and a further object of the invention is to provide a receiving box of a simple, durable and efficient construction which is susceptible of being made in various sizes and shapes.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawing, Figure 1 is a perspective view of one form of safety receiving box embodying my invention.

Figure 1:
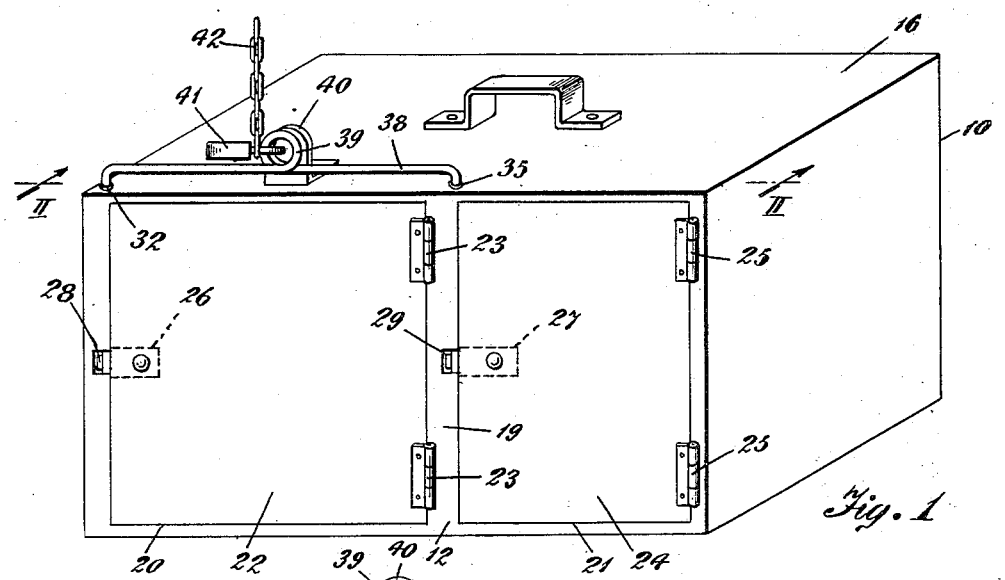
Figure 2:
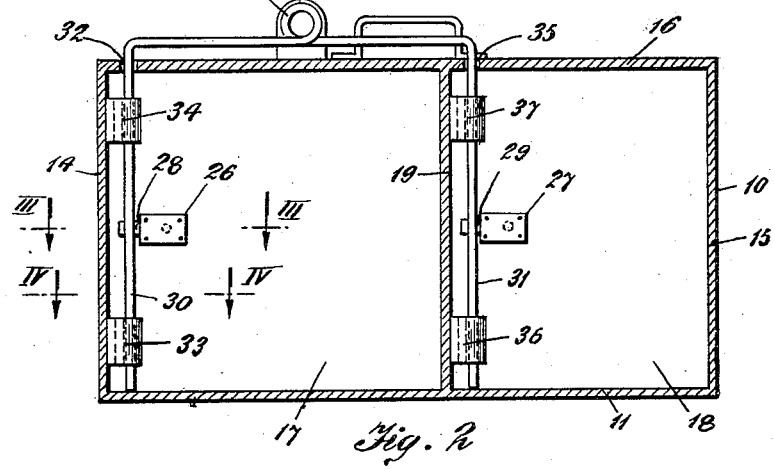
Fig. 2 is a detail sectional view taken on the line II—II of Fig. 1.
Figure 3:
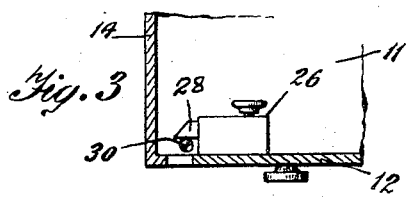
Fig. 3 is a fragmentary detail sectional view taken on the line III—III of Fig. 2.
Figure 4:
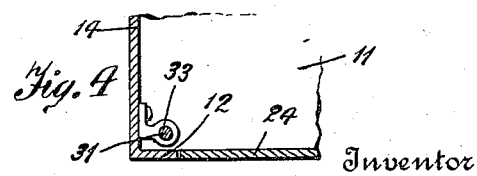
Fig. 4 is a fragmentary sectional view taken on the line IV—IV of Fig. 2.

The device has a casing 10 which may be of any desired shape and size as well as being made of any suitable material, though the casing is preferably made of sheet metal in substantially a rectangular form to provide a bottom 11, front wall 12, rear wall, end walls 14, 15 and a top 16. The interior of the casing may consist of one compartment, or may be divided into a number of compartments, as 17 and 18, of equal or different sizes by arranging therein a partition, as 19, extending from the front to the rear walls. Leading through the front wall of the casing into the compartment 17 is an entrance 20, and leading also through the front wall of the casing into the compartment 18 is an entrance 21. The entrance 20 is adapted to be opened and closed by a door 22 which is hinged, at 23, to the casing so as to be swung toward and from the compartment 17, and the entrance 21 is adapted to be opened and closed by a door 24 which is hinged, at 25, to the casing so as to be likewise swung toward and from the compartment 18.

In order to permit the doors 22 and 24 to be releasably fastened against being surreptitiously opened when closed, on the inside of the door 22 at its free edge is a locking device 26, and also on the inside of the door 24 at its free edge is another locking device 27. Both of these locking devices may be of any well known, or preferred types of locks or catches, though they are preferably of forms having the usual spring actuated bolts, as 28 and 29, respectively, which are operated by being movable inwardly and outwardly of the casing of the locks in the customary manner, or instead of these locks any other suitable means may be provided for releasably locking the doors.

By arranging the locking devices in this manner on the doors they will be operable when the doors are closed, and serving to accomplish this any desired means may be provided, though I prefer to employ retaining elements or rods, as 30 and 31, in the compartments for being releasably engaged by the bolts 28 and 29 of the locking devices. The rod 30 being removably disposed through an opening 32 in the top of the casing as well as being disposed through two spaced sleeves 33 and 34 extending into the compartment 17 from the end wall 14 of the casing, while the rod 31 is removably disposed through an opening 35 in the top of the casing and this rod is also removably disposed through two spaced sleeves 36 and 37 projecting into the compartment 18 from the partition 19. The rods, or retaining elements 30 and 31 are both arranged in the casing in the paths of movement of the bolts of the locking devices 26 and 27 so that when the doors 22 and 24 are closed the bolts will engage the rods for being forced inwardly of their casings, and then sprung outwardly thereof for engaging the back of the rods. In this manner the doors will be releasably locked to the casing 10 when closed. The rods 30 and 31 are of lengths so that their upper ends extends somewhat above the casing, and these upper ends of the rods may be connected by a cross-bar 38 having a loop, as 39, in its central part to allow the rods to be removed from their sleeve as well as from the casing.

The rods, or retaining elements may then be simultaneously manipulated to unlock the doors, and serving to prevent the rods from being surreptitiously removed from the casing and also to prevent the device from being stolen the loop 39 of the cross-bar 38 of the rods 30 and 31 may be releasably locked to an eye 40 provided on the top of the casing adjacent to the loop by a padlock, as 41, which may be of any ordinary, or preferred form to which is fastened one end of a chain, or line 42 having its other end attached to the frame of a door, or other support, or any other suitable means may be employed for releasably locking the loop to the casing as well as for releasably locking the device to a support when placed for reception of articles.

To employ the device for receiving with safety food products, such as groceries, milk, ice and other articles when delivered the device is arranged exteriorly of the home of the owner, and the end of the line 42 opposite to the padlock 41 is fastened on the door, or window of the home after the doors of the casing 10 are arranged in open positions. The articles when delivered are placed in one or more of the compartments of the casing 10, and the door of each compartment when closed will be locked against being surreptitiously opened by the bolt of the lock of each door engaging the rod, or retaining element in its respective compartment, as above explained. To remove the contents from one, or more of the compartments, the padlock 41 is unlocked and removed from the loop 39 of the connecting cross-bar of the rods as well as being removed from the eye 40 of the casing 10. By then pulling the loop upwardly the rods 30 and 31 will be removed entirely or partially from their sleeves in the casing for releasing the engagement of the rods from the bolts of the locks of the doors, and the doors may be swung open to remove the contents from the compartments. Thus a receiving box is provided whereby articles may be delivered to a home for being safely kept as well as being kept in a clean sanitary condition without notifying or disturbing the occupants of the home.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. A safety receiving box, comprising a casing having separated compartments with an entrance leading into each compartment and having doors one for opening and closing each entrance, retaining elements removably arranged in the compartments one at each entrance, a locking device on each door for releasably engaging the retaining element at the entrance of the door when closed, and means on the retaining elements as well as on the casing whereby a separate lock may be used to releasably hold the elements against removal from the casing.

2. A safety receiving box, comprising a casing having separated compartments with an entrance leading into each compartment and having doors one for opening and closing each entrance, connected retaining rods removably arranged in the compartments one at each entrance, a locking device on each door for releasably engaging the rod at the entrance of the door when closed, and means on the connected part of the rods as well as on the casing to allow both to be detachably locked to a support.

This specification signed and witnessed this 9th day of February, A. D. 1917.

JOSEPH FRIEDLAND.

Witnesses:
  GEORGE F. BENTLEY,
  V. M. RUMPH.

Copies of this patent may be obtained for five cents each, by addressing the "Commissioner of Patents, Washington, D. C."